United States Patent

Yanai et al.

Patent Number: 5,114,778
Date of Patent: May 19, 1992

[54] MAGNETIC RECORDING MEDIUM

[75] Inventors: Akio Yanai; Tadashi Yasunaga, both of Kanagawa, Japan

[73] Assignee: Fuji Photo Film Co., Ltd., Kanagawa, Japan

[21] Appl. No.: 261,068

[22] Filed: Oct. 24, 1988

[30] Foreign Application Priority Data

Oct. 23, 1987 [JP] Japan .................. 62-267702

[51] Int. Cl.⁵ .................................. B32B 3/00
[52] U.S. Cl. .......................... 428/141; 428/694; 428/900
[58] Field of Search ................. 428/694, 900, 141

[56] References Cited

U.S. PATENT DOCUMENTS

| | | |
|---|---|---|
| 4,152,469 | 5/1979 | Allen et al. |
| 4,275,113 | 6/1981 | Saito et al. ........... 428/900 |
| 4,333,985 | 6/1982 | Shirahata et al. |
| 4,390,601 | 6/1983 | Ono et al. |
| 4,540,618 | 9/1985 | Suzuki et al. ........... 428/141 |
| 4,578,729 | 3/1986 | Suzuki et al. |
| 4,619,856 | 10/1986 | Kamada et al. ........... 428/900 |
| 4,664,964 | 5/1987 | Okita et al. ........... 428/900 |
| 4,670,319 | 6/1987 | Katoh et al. |

FOREIGN PATENT DOCUMENTS

| | | |
|---|---|---|
| 58-100221 | 6/1983 | Japan . |
| 58-68223 | 11/1983 | Japan . |
| 58-68224 | 11/1983 | Japan . |
| 62-130848 | 4/1987 | Japan . |

OTHER PUBLICATIONS

T. C. Patton, "Paint Flow and Pigment Dispersion," pp. 443-449, 109-115, published by Interscience Publishers (1966).

*Primary Examiner*—Merrell C. Cashion, Jr.
*Assistant Examiner*—Robert J. Follett
*Attorney, Agent, or Firm*—Sughrue, Mion, Zinn, Macpeak & Seas

[57] ABSTRACT

A magnetic recording medium having improved running properties and electromagnetic characteristics is disclosed, which comprises a non-magnetic support having provided thereon an underlayer and a magnetic layer composed of a thin ferromagnetic metal film in that order, said underlayer being composed mainly of a high molecular weight compound having on the surface thereof an uneven orange peel texture, wherein said underlayer has an average surface area of a unit cell of the uneven orange peel texture of from $3 \times 10^{-6}$ to $3 \times 10^{-3}$ mm$^2$, and has a surface roughness of from 0.1 to 0.01 μm.

3 Claims, 1 Drawing Sheet

MAGNETIC RECORDING MEDIUM

FIELD OF THE INVENTION

This invention relates to a magnetic recording medium having a thin ferromagnetic metal film as a magnetic layer, and more particularly to a magnetic recording medium having excellent running properties and electromagnetic characteristics.

BACKGROUND OF THE INVENTION

For a magnetic recording medium, a higher coercive force and a much thinner recording layer are necessary to increase recording density upon magnetic recording. In a so-called coated type magnetic recording medium which is prepared by mixing, kneading and dispersing magnetic particles with a binder and coating the thus obtained dispersion on a non-magnetic support and drying, reduction in the thickness of a recording layer is limited because it contains binders. On the other hand, in a so-called thin ferromagnetic metal film type magnetic recording medium which is prepared by providing on a support a thin ferromagnetic metal film by physical vapour deposition method (such as vacuum evaporation or sputtering, chemical phase growing method, or a metal plating method such as an electroless plating method or electric plating), it is possible to provide a recording layer having a thickness of 0.1 micron or lower.

However, when a medium's recording layer is as thin as 0.1 μm or lower, the medium is likely to be influenced largely by the nature of the surface of the support. Desirably, the surface of a support should be smoothed. However, the friction coefficient of the medium is increased and running properties upon recording and reproduction are remarkably decreased by smoothing the surface.

Many approaches have been proposed to solve the above problems of providing a smooth surface without increasing the friction coefficient and decreasing the running properties upon recording and reproduction.

It is disclosed in various patents such as U.S. Pat. Nos. 4,152,469, 4,333,985 and 4,390,601 that an overcoat layer composed of organic compounds is provided on a thin ferromagnetic metal film. However, in such media there is a problem that organic compounds of the overcoat layer rapidly come off from the thin metal film after repeated use. These organic compounds then attach on a head or a guide pole, thereby causing the tape to stop running.

It is also disclosed in U.S. Pat. No. 4,540,618, JP-A-58-100221 and U.S. Pat. No. 4,578,729 that microscopic projections are formed on a surface of a thin ferromagnetic metal film. (The term "JP-A" as used herein means an "unexamined published Japanese patent application"). However, in such media, ferromagnetic metal particles which have abnormally grown from inorganic fine particles as a nucleus present on a support are used as microscopic projections, and this use has the undesirable effect of causing an increase of noise.

It is disclosed in JP-A-59-32580, and JP-A-62-130848, and in U.S. Pat. Nos. 4,670,319 and 4,508,182 that fine particles are incorporated into a plastic film to form unevenness (concave & convex) on the surface of a film of a non-magnetic support. In such media, the height and the shape of the unevenness (concave & convex) vary depending upon the position of the particles in the thickness direction of the film. When the height of unevenness is high and the unevenness is steep, these variations cause drop out, and when the height of unevenness is low, sufficient running properties cannot be obtained. Further, when the direction and the shape of unevenness (concave & convex) are irregular, the envelope of reproduced output is disturbed.

On the other hand, JP-A-58-68223 and JP-A-58-68224 disclose a flexible support having microscopic unevenness, which is prepared by coating silicon emulsion on a support and then stretching. However, the above undercoating is likely to separate at the stretching step, and thus partially cause deterioration of the adhesiveness between the undercoating and the support, thereby causing drop outs in many cases.

SUMMARY OF THE INVENTION

An object of this invention is to provide a thin ferromagnetic metal film type magnetic recording medium having constant friction coefficient after repeated use, stable running properties, excellent durability and having excellent electromagnetic characteristics.

The above object of this invention can be attained by a magnetic recording medium comprising a non-magnetic support having provided thereon an underlayer and a magnetic layer composed of a thin ferromagnetic metal film in that order, the underlayer being composed mainly of a high molecular weight compound, having on the surface thereof an even orange peel texture based on convection cell, wherein the underlayer has an average surface area of a unit cell of the uneven orange peel texture of from $3 \times 10^{-6}$ to $3 \times 10^{-3}$ mm$^2$ and has a surface roughness of from 0.01 to 0.1 μm.

DETAILED DESCRIPTION OF THE INVENTION

The above described uneven orange peel texture is formed based upon a convection cell known as "Bernard cells" for a long time, the unevenness (concave & convex) formed on the surface of a coated film therefrom being referred to as "orange peel". This uneven orange peel texture and its formation are disclosed, in T. C. Patton, "Paint Flow and Pigment Dispersion", pp. 443–447, published by INTERSCIENCE PUBLISHERS (1966). The process for forming an orange peel is explained below. That is, when a solution of high molecular weight compounds (which form a coated film) is coated on a support and then dried, the heated solution ascends higher within the undried film because the density of the heated solution decreases. Then, the solution reaches the surface of the coated film comes in contact with the atmosphere, and is cooled; or it is also cooled due to evaporation heat as the solvent evaporates. Thus, the density of the solution increases. As a result, vertical descending flow occurs and slightly visual convection (whirl flow) occurs inside of the solution. Then, solvents evaporate to a large extent, and high molecular compounds are dried in an unmovable state. So, the ascended solution is dried to form swollen parts, which appear as an uneven or woven texture (orange peel texture), which appears with regularity throughout the surface of the medium.

Many efforts have been made to prevent orange peel because it deteriorates the gloss of a coated film. In a magnetic recording medium, an underlayer composed of organic high molecular compounds is provided to improve adhesiveness between a support and a magnetic layer, as described in U.S. Pat. Nos. 4,504,542, 4,468,436, 4,528,240 and 4,617,226. However, the orange peel forming approach of the present invention has not been developed, since orange peel occurring in that approach has heretofore been considered undesirable. On the other hand, suitable adjustment of surface roughness of a magnetic layer which is capable of providing stable running properties without increasing noise and disturbance of the reproduced output envelope has strongly been desired for a thin ferromagnetic metal film type magnetic recording medium.

The inventors of this invention made thorough studies to see whether or not sliding resistance between a medium and running parts can be reduced by varying the surface shape of an underlayer, and found that the above object can be attained by the unevenness of the above-defined orange peel texture.

In this invention, a magnetic recording medium refers to not only a medium in the tape shape but also to a medium in the disk shape.

The magnetic recording medium of this invention is hereinafter illustrated in more detail.

Figure 1:
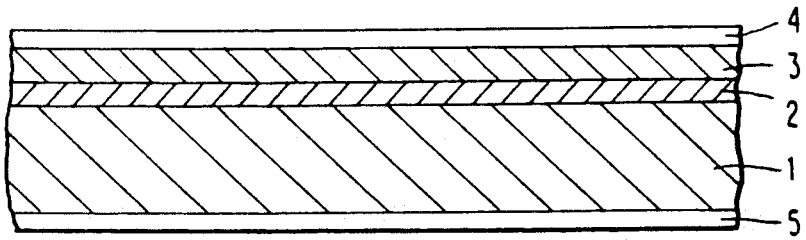
FIG. 1 shows one example of a layer structure of a magnetic recording medium of this invention.

As shown in FIG. 1 in the embodiment of this invention, the magnetic recording medium of this invention is structurally composed of non-magnetic support 1, an underlayer 2 provided thereon, and a thin ferromagnetic metal film 3 provided on top of the underlayer 2, and optionally a protective lubricating layer 4 and a backing layer 5.

The above described thin ferromagnetic metal film 3 is formed by a physical vapour deposition method such as vacuum evaporation or sputtering, a chemical phase growing method or a plating method such as electroless plating or electric plating, as described in U.S. Pat. Nos. 3,342,632 and 3,342,633.

Figure 2:
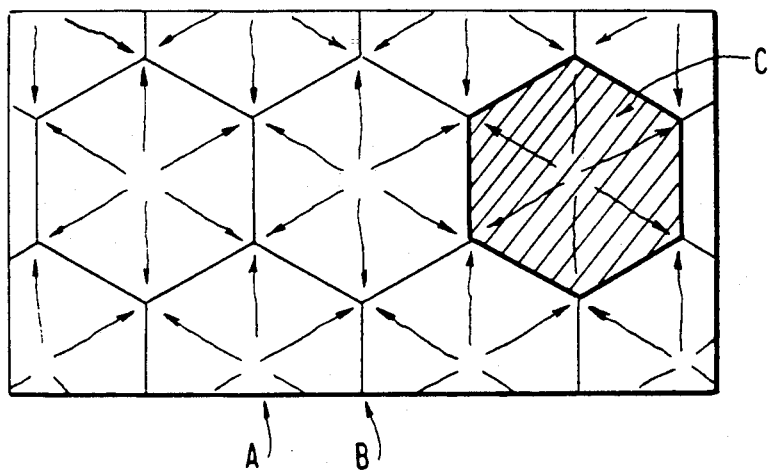
FIG. 2 is a plain view showing an underlayer composed of a high molecular weight compound of a magnetic recording medium of this invention.
Figure 3:
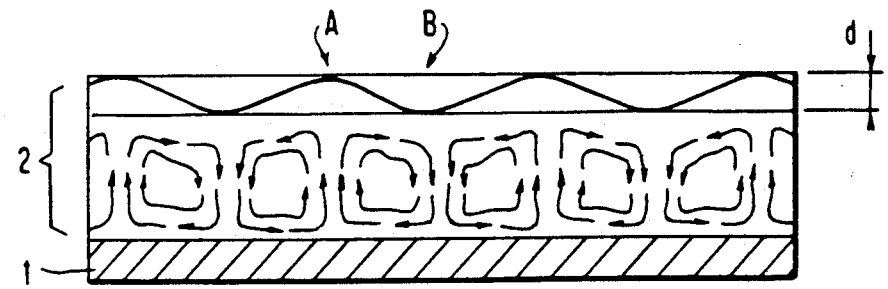
FIG. 3 is a sectional view showing an underlayer composed of a high molecular weight compound.

The underlayer 2 of a high molecular compound ideally has unevenness having nearly hexagonal orange peel woven texture generated due to occurrence of convection cells, as shown in FIG. 2. In actuality, patterns other than the hexagonal patterns (e.g., circular patterns, rectangular patterns, etc.) appear in some cases, but it is characteristic that comparatively regular patterns are continuously formed on the whole surface of a coated film. In the orange peel texture, the difference in height d between the convex A and the concave D (see FIG. 3; hereinafter, this difference is referred to as surface roughness) is from 0.01 to 0.1 $\mu$m, preferably from 0.02 to 0.08 $\mu$m and the average surface area of the unit cell is from $3 \times 10^{-6}$ to $3 \times 10^{-3}$ mm$^2$. The unit cell is the area surrounded by the valley-like concave B (for example, the area C as shown in FIG. 2). The surface roughness is generally measured by a needle contact type surface roughness meter (e.g., "Talystep" made by Rank Taylor Hoblin Co, Ltd., and "Alpha step" made by Tencor Co., Ltd.). The surface area of the unit cell is determined by observing the surface (Ag or Al is generally coated) of the underlayer by a differential interference microscope and counting the number (n) of the unit cells within the area of 1 mm$^2$. The surface area is given as the reciprocal of the number (1/n mm$^2$) of the unit cell.

When the surface roughness is higher than 0.1 $\mu$m, the distance between the medium and a magnetic head is large and spacing loss is large, and, as a result, recording and reproducing cannot sufficiently be achieved. Also, when an average surface area of the unit cell is larger than $3 \times 10^{-3}$ mm$^2$, the effect of reducing the friction coefficient decreases, and stable running properties cannot be obtained. On the contrary, when the average surface area of the unit cell is smaller than $3 \times 10^{-6}$ mm$^2$, the surface roughness is lower than 0.01 $\mu$m and stable running properties cannot be obtained, and above all, it is extremely difficult to form the unit cell having the above-described surface area.

The surface area of the unit cell and surface roughness can be varied by optionally selecting the thickness of the underlayer, coating composition (such as high molecular materials or solvents), viscosity of the coating composition, and drying temperatures of the coated film. The orange peel texture is more easily formed as the viscosity of the coating composition decreases and also as the drying temperature increases. As the thickness of the underlayer of a high molecular weight compound increases, surface roughness generally increases and surface area of the unit cell tends also to increase. When the magnetic recording medium is used as a magnetic tape, the thickness of the underlayer should be reduced to be as thin as possible in light of the demand for minimizing the size of the tape. Accordingly, the acceptable thickness of an underlayer of a high molecular weight compound having uneven orange peel texture is from 0.3 to 3 $\mu$m, preferably from 0.3 to 1 $\mu$m.

The high molecular weight compounds for use in the underlayer are widely selected from conventionally known thermoplastic resins, thermosetting resins and resins hardenable with radiation. Those that have good affinity with a support are particularly preferred. Specific examples include polyester type polymers, polyurethane type polymers, copolymers of vinyl chloride and vinylidene chloride, copolymers of vinyl chlorodide and vinyl acetate, acrylic type copolymers, cellulose derivatives and copolymers of styrene and butadiene. These high molecular weight compounds preferably have a number average molecular weight (Mn) of from 10,000 to 100,000 and a weight average molecular weight (Mw) of from 20,000 to 60,000.

Hardening agents can also be used with the high molecular weight compounds, such as three functional polyisocyanates derived from tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate, triphenylmethane diisocyanate, etc, which are commercially available under tradenames "Collonate L", "Collonate HL", "Collonate 2030", "Collonate 2031", "Millionate MR" and "Millionate MTL" (produced by Nippon Polyurethane Co., Ltd.); "Takenate D-102", "Takenate D-110N", "Takenate D-200" and "Takenate D-202" (produced by Takeda Chemical Industries, Ltd.); and "Desmodule L", "Desmodule IL", "Desmodule N" and "Desmodule HL" (produced by Sumitomo Bayer Urethane Co., Ltd.)

These high molecular weight compounds are dissolved in an organic solvent and the viscosity of the resulting coating composition is adjusted to from 1 to 20 cP. The rate of organic solvent evaporation is one of the important parameters for forming unevenness of the orange peel texture. As the evaporation rate increases, convection cells are more likely to form in the inside of the coated film, and those having a high vapor pressure preferably of from 20 to 200 mmHg at 20° C. are suitably used for the purpose.

Solvents such as ketones (e.g., acetone, methyl ethyl ketone, methyl isobutyl ketone), alcohols (e.g., methanol, ethanol, isopropanol), esters (e.g., methyl acetate, ethyl acetate, butyl acetate) or aromatic hydrocarbons (e.g., benzene, toluene, xylene) are used. These organic solvents are used alone or in mixture. The viscosity of the coating composition is preferably from 1 to 20 cP as described above. As the viscosity decreases, the orange peel texture is more easily obtainable. However, when the viscosity is too low, it is difficult to form a coated film having a desired thickness, and the thickness is likely to be uneven. The surface area of the unit cell and the surface roughness can be varied to some extent by controlling the speed of evaporation. For this reason, a solvent having a vapor pressure lower than 20 mmHg at 20° c. may be added to a main solvent. For example, 0 to 20 wt % of cyclohexanone may be added as an additive solvent to a main solvent, e.g., methyl ethyl ketone.

A high molecular weight underlayer having fine particles dispersed therein, can be used. The fine particles include particles such as carbon black or graphite, various metal oxides such as $SiO_2$, $TiO_2$, $Al_2O_3$, $Cr_2O_3$, $Fe_2O_3$ or ZnO, metals such as Fe, Al, Cu or Ni, inorganic compounds such as calcium carbonate, and resin particles such as polyethylene or polytetrachloroethylene. The particle diameter is 1 μm or lower, preferably 0.1 μm or lower. As the particle size increases, the surface roughness of the underlayer increases, affecting the surface properties of the thin ferromagnetic metal film and deteriorating electromagnetic characteristics.

The mixing ratio (by weight) of the fine particles to the high molecular weight compound is 6/1 or lower, preferably 5/1 or lower. As the mixing ratio of fine particles increases, surface roughness increases, thereby deteriorating electromagnetic properties, and the uneven orange peel texture is hardly formed. When an underlayer of a high molecular weight compound(s) having fine particles uniformly dispersed therein is provided, the uneven orange peel texture is readily formed. As a result of microscopic projections being further formed due to fine particles on the surface of an underlayer of high molecular compounds, running properties of a magnetic recording medium can be made more stable.

As described above, a feature of the present invention is that the underlayer of high molecular weight compounds of this invention has an uneven orange peel texture on the surface of the layer, and this texture appears with regularity throughout the surface of the medium. That is, unevenness having substantially constant pitch and height is continuously distributed on the whole surface of the underlayer. The pitch (internal) of unevenness is from 1 to 60 μm, which is larger than the pitch conventionally provided on the surface of a non-magnetic support. For the above-described reasons, there are various advantages that there are neither projections nor unevenness locally formed on the surface of the thin ferromagnetic metal film: Drop out and disturbance of the envelope of reproduced output do not occur, and as the magnetic recording medium runs with the surface of a magnetic layer contacting running parts such as the running system of a cassette or the guide pole of VTR at a constant contact surface area, change of friction can be reduced and stable running can be secured.

Materials for the thin ferromagnetic metal film include ferromagnetic metals such as iron, cobalt or nickel, and ferromagnetic alloys such as Fe-Co, Fe-Ni, Co-Ni, Fe-Rh, Co-P, Co-B, Co-Y, Co-La, Co-Ce, Co-Pt, Co-Sm, Co-Mn, Co-Cr, Fe-Co-Ni, Co-Ni-P, Co-Ni-B, Co-Ni-Ag, Co-Ni-Nd, Co-Ni-Ce, Co-Ni-Zn, Co-Ni-Cu, Co-Ni-W or Co-Ni-Re. The film is prepared from the above materials by electric plating, electroless plating, phase plating, sputtering, evaporation or ion plating. The thickness of the film is from 0.02 to 2 μm, preferably from 0.05 to 0.4 μm, when the film is used for a magnetic recording medium.

In addition to the above, the thin ferromagnetic metal film can include O, N, Cr, Ga, As, Sr, Zr, Nb, Mo, Rh, Pd, Sn, Sb, Te, Pm, Re, Os, Ir, Au, Hg, Pb and Bi.

The supports for use in this invention include polyesters such as polyethylene terephthalate; polyolefins such as polyethylene or polypropylene; cellulose derivatives such as cellulose triacetate; cellulose diacetate, or cellulose acetate butyrate; vinyl type resins such as polyvinyl chloride or polyvinylidene chloride; plastics such as polycarbonates, polyidmides or polyamide imides; light metals such as aluminum alloys or titanium alloys; and ceramics such as alumina glass. The shape of the non-magnetic support can be any one of a film, a sheet, a disk, a card and drum.

A protective lubricating layer and a backing layer may be provided to further improve running properties and durability, as described in U.S. Pat. Nos. 4,448,843, 4,565,734 and 4,557,944 with respect to the protective lubricating layer, and U.S. Pat. Nos. 4,670,333, 4,411,953 and 4,310,599 with respect to the backing layer.

The materials of the protective lubricating layer include fatty acid, metal soap, fatty acid amide, fatty acid ester, higher aliphatic alcohol, monoalkylphosphate, dialkyl phosphate, trialkylphosphate, paraffins, silicone oil, animal and vegetable oil, mineral oil, or higher aliphatic amine; inorganic particles such as graphite, silica, molybdenum disulfide, or tungsten disulfide; resin particles such as polyethylene, polypropylene, polyvinyl chloride, or a copolymer of vinyl chloride and ethylene; α-olefin polymer; unsaturated aliphatic hydrocarbon which is liquid at a normal temperature. The protective lubricating layer is prepared by coating or adsorbing the above materials on the thin ferromagnetic metal film in an amount of from 0.5 to 100 mg/m². The backing layer is prepared by coating the dispersion of carbon black, or carbon black and inorganic pigments, with organic binders (e.g., as described in JP-A-59-218632, JP-A-59-210533 and JP-A-59-42634).

EXAMPLES AND COMPARATIVE EXAMPLES

The invention will be illustrated more specifically by the following Examples, but should not be construed as being limited thereto.

An underlayer of a high molecular weight compound having a thickness of from 0.3 to 1 μm was formed on a 10 μm-thick polyethylene terephthalate film by coating the following coating composition.

| Coating composition for underlayer | |
|---|---|
| Polyurethane ("Nipporan #2301" made by Nippon Polyurethane Co., Ltd.; Mn about 21,000) | 2.5 wt % |

-continued

| Coating composition for underlayer | |
|---|---|
| Hardening agent ("Collonate L", made by Nippon Polyurethane Co., Ltd.) | 3.0 wt % |
| Cyclohexanone | shown in Table 2 (from 0 to 15 wt %) |
| Methyl ethyl ketone | balance (from 94.5 to 79.5 wt %) |

A coil bar method was used for coating an underlayer of the high molecular weight compound. The coating composition having the above formulation was coated on the film travelling at a rate of 20 m/min., and dried with drying air at a temperature of from 50° to 100° C. and at a flow rate thereof of from 0.2 to 10 m/sec. (as shown in Table 1) to obtain an underlayer of a high molecular weight compound having uneven orange peel texture. The size of the unit cell of the woven texture pattern and the surface roughness were varied mainly by selecting the additive amount of cyclohexanone and the diameter of wire of the coil bar. (Sample Nos. 1 to 8).

Separately, 0.3 part by weight (as a solid) of silica sol ("OSCAL #1432, #1453", made by NIPPON SHOKUBAI KAGAKU KOGYO CO., LTD.) having dispersed silica fine particles of 20 nm or 40 nm in diameter was added to 100 parts by weight of the above coating composition, and the resulting composition was coated to prepare an underlayer (Sample Nos. 9 and 10).

Oblique-incidence deposition using Co-Ni alloy (Co/Ni: 80/20 by atomic ratio) in an oxygen gas atmosphere was conducted on each support thus provided with an underlayer of a high molecular weight compound travelling at a rate of 20 m/min. under vacuum ($2 \times 10^{-4}$ Torr) to prepare a thin magnetic film having a thickness of 2000 Å. The minimum angle of the vapor incidence to the normal of the support was 38° and the maximum angle was 90°. The thus-prepared samples were identified as Sample Nos. 1 to 10.

The size of the unit cell was measured by differential interference microscope, and the surface roughness was measured by Talystep (made by Rank.Taylor Hobson Co. Ltd.).

For comparison, Sample No. 11 was prepared wherein the above thin magnetic film was directly provided o the film without providing the above underlayer of a high molecular weight compound.

A polyethylene terephthalate film having on the surface thereof projections ($3 \times 10^5$ projections per 1 mm$^2$), which projections had a diameter of about 1 μm and a height of 0.02 μm and which were formed by adding silica fine particles having an average particle diameter of 0.08 μm in an amount of 0.05 wt % into film materials at the step of preparing the film, was provided with the thin magnetic film to obtain Sample No. 12.

A protective lubricating layer containing a fluorine compound was provided on the surface of the magnetic layer of those samples and a backing layer containing carbon black was also provided on the opposite surface thereof.

The samples were then slit to a 8 mm width, and dynamic friction coefficient, running properties, drop out, envelope of reproduced output and S/N of the samples were measured. The results are shown in Table 2, and in order to evaluate these results, the following should be noted:

Dynamic Friction Coefficient

The value of dynamic friction coefficient (μ) was calculated from the following equation:

$$\mu = \frac{1}{\pi} l_n \frac{\alpha}{20}$$

wherein α is a pulling stress measured after repeating the following procedure 100 times: rounding a test tape on a half (180°) of a stainless pole (φ4; SUS420J) and rubbing the tape at a speed of 1.5 cm/sec while suspending a weight of 20 g at the end of the tape.

Running Properties

The NTSC color bar signals were recorded on a tape of 90 minute length using a 8 mm VTR ("FUJIX-8D-300", made by Fuji Photo Film Co., Ltd.), and when the tape was run repeatedly for 10 passes, the running properties were evaluated in terms of jitter. Jitter was measured using a jitter meter "MK-611A" made by Meguro Denshi Co., Ltd. The Running properties were evaluated at 23° C. and 70% RH.

Drop out

Using a VTR drop out counter "VHOIBZ" made by Shibasoku Co., Ltd., the number of drop out for 15 μsec or more was counted at the first pass and the 10th pass when the signals were reproduced at the above test of evaluating running properties.

S/N Ratio

Using the above described VTR, 50% white signals were recorded, and noise was measured using a NTSC color video noise meter "925R/1" made by Shibasoku Co., Ltd. A commercially available metal tape "FUJIX P6-90" was used as the standard tape, and S/N of that tape was assumed to be 0 dB.

Envelope

RF signals were observed by an oscilloscope while the tape were running repeatedly as described above. When the envelope curve of the shape of the signal waves was rectangular, the envelope was evaluated as good; when it was fluffy or a part of the envelope curve was missing, it was evaluated as inferior.

The results of the evaluations are shown in Table 2. It is clear from the table that the magnetic tape having an underlayer of a high molecular compound of this invention exhibits low friction coefficient, stable running properties, good envelope, reduced drop out and excellent S/N ratio. When the tape has an underlayer further containing fine particles (Sample Nos. 8 and 9), more stable running properties can be obtained, though S/N ratio is slightly deteriorated.

TABLE 1

| Sample No. | Coating Speed (m/min) | Drying Condition | |
|---|---|---|---|
| | | Temperature (°C.) | Flow Rate (m/sec) |
| 1 | 20 | 100 | 8 |
| 2 | " | " | " |
| 3 | " | 90 | " |
| 4 | " | " | " |
| 5 | " | " | " |
| 6 | " | " | " |
| 7 | " | " | " |
| 8 | " | 80 | 5 |
| 9 | " | 100 | 8 |
| 10 | " | " | " |

TABLE 1-continued

| Sample No. | Coating Speed (m/min) | Drying Condition Temperature (°C) | Flow Rate (m/sec) |
|---|---|---|---|
| 11 | — | — | — |
| 12 | — | — | — |

When a smooth underlayer having no orange peel texture is provided, the tape stopped running midway, and it was impossible to measure S/N ratio. The same phenomenon took place in the case of Sample No. 11 which had no underlayer.

When a fine particle added film was used (Sample No. 12), running properties were poor, drop out increased and S/N ratio was also inferior.

TABLE 2

| Sample No. | Example/ Comparative Example | Features | Amounts by cyclohexanone (wt %) | Diameter of coil bar wire (mm) | Thickness of underlayer (μm) | Surface area of unit cell (mm²) | Surface roughness (μm) | Dynamic friction coefficient | Jitter (μs) | Envelope | Drop out at 1st/10th pass | S/N ratio (dB) |
|---|---|---|---|---|---|---|---|---|---|---|---|---|
| 1 | Example | Underlayer of orange peel texture | 10 | 0.05 | 0.3 | $5 \times 10^{-6}$ | 0.05 | 0.24 | 0.10 | good | 32/38 | +6.1 |
| 2 | " | Underlayer of orange peel texture | 5 | 0.10 | 0.5 | $2 \times 10^{-4}$ | 0.07 | 0.22 | 0.09 | " | 28/35 | +5.0 |
| 3 | " | Underlayer of orange peel texture | 3 | 0.12 | 0.7 | $1 \times 10^{-3}$ | 0.09 | 0.24 | 0.07 | " | 31/35 | +3.0 |
| 4 | " | Underlayer of orange peel texture | 15 | 0.07 | 0.4 | $8 \times 10^{-5}$ | 0.03 | 0.25 | 0.10 | " | 26/34 | +5.7 |
| 5 | Comparative Example | Underlayer of orange peel texture | 0 | 0.12 | 0.5 | $3 \times 10^{-4}$ | 0.12 | 0.20 | 0.07 | no good | 62/95 | −0.5 |
| 6 | Comparative Example | Underlayer of orange peel texture | 3 | 0.17 | 0.5 | $4 \times 10^{-3}$ | 0.05 | 0.35 | 0.16 | no good | 58/76 | +2.7 |
| 7 | Comparative Example | Underlayer of orange peel texture | 10 | 0.04 | 0.2 | $2 \times 10^{-6}$ | 0.05 | 0.42 | 0.19 | no good | 31/47 | +3.5 |
| 8 | Comparative Example | Underlayer having no orange peel texture | 0 | 0.04 | 0.3 | — | 0.03 | 0.48 | Tape would not run. | | | impossible to measure |
| 9 | Example | Underlayer having orange peel texture having 20-nm fine particles | 5 | 0.10 | 0.5 | $2 \times 10^{-4}$ | 0.08 | 0.20 | 0.08 | good | 29/38 | +3.8 |
| 10 | Example | Underlayer having orange peel texture having 40-nm fine particles | 5 | 0.10 | 0.5 | $2 \times 10^{-4}$ | 0.08 | 0.19 | 0.07 | good | 32/35 | +3.0 |
| 11 | Comparative Example | No underlayer | — | — | — | — | 0.01 | >0.5 | Tape would not run. | | | impossible to measure |
| 12 | Comparative Example | Film containing fine particles was used | — | — | — | — | 0.02 | 0.42 | 0.21 | no good | 67/146 | +0.5 |

Although an uneven orange peel texture was formed, when the unit cell is too small (Sample No. 7), the friction coefficient increases, and therefore stable running properties cannot be assured. On the other hand, when the unit cell is too large (Sample No. 6), phenomenon also took place. Even though the unit cell surface area is within the range as defined in this invention, when the surface roughness is too high (Sample No. 5), running properties are good, but envelope, drop out and SN ratio are inferior.

According to the present invention, the magnetic layer of a thin magnetic metal film has a similar pattern with the woven orange peel texture formed with regularity on the underlayer of a high molecular compound. So, by defining the ranges of the surface area of the unit cell of the orange peel texture and the surface roughness, a magnetic recording medium having low friction coefficient, stable running properties and excellent electromagnetic characteristics can be obtained.

While the present invention has been described in detail and with reference to specific embodiments thereof, it will be apparent to one skilled in the art that various changes and modifications can be made therein without departing from the spirit and scope thereof.

What is claimed is:

1. A magnetic recording medium comprising a nonmagnetic support having provided thereon an underlayer and a magnetic layer composed of a thin ferromagnetic metal film in that order, said underlayer being composed mainly of a resin compound having on the surface thereof an uneven orange peel texture, wherein said underlayer has an average surface area of a unit cell of the uneven orange peel texture of from $3 \times 10^{-6}$ to $3 \times 10^{-3}$ mm$^2$ and has a surface roughness of from 0.01 to 0.1 μm.

2. A magnetic recording medium as in claim 1, wherein said underlayer has a thickness of from 0.3 to 3 μm.

3. A magnetic recording medium as in claim 2, wherein said underlayer has a thickness of from 0.3 to 1 μm.

* * * * *